Dec. 11, 1962 S. ROSEN 3,067,786
FLUID HANDLING AND FILLING MACHINE
Filed April 23, 1958 3 Sheets-Sheet 1

SIDNEY ROSEN
INVENTOR.

BY Walter G. Finch
ATTORNEY

Dec. 11, 1962      S. ROSEN      3,067,786

FLUID HANDLING AND FILLING MACHINE

Filed April 23, 1958      3 Sheets-Sheet 2

OPERATIONAL CYCLE

SIDNEY ROSEN
INVENTOR.

BY *Walter G. Finch*

ATTORNEY

Dec. 11, 1962   S. ROSEN   3,067,786
FLUID HANDLING AND FILLING MACHINE
Filed April 23, 1958   3 Sheets-Sheet 3

SIDNEY ROSEN
INVENTOR.

BY Walter G. Finch
ATTORNEY

United States Patent Office 3,067,786
Patented Dec. 11, 1962

3,067,786
FLUID HANDLING AND FILLING MACHINE
Sidney Rosen, 2701 Rockwood Ave., Baltimore 15, Md.
Filed Apr. 23, 1958, Ser. No. 730,442
2 Claims. (Cl. 141—179)

The present invention relates generally to an improved handling system for semi-viscous fluids. More particularly, the invention pertains to automatic controls for handling and pumping semi-viscous liquids into containers, such as vials, ampoules, and small vessels.

In my Patent Number 2,807,213, for "Filling Machine," issued September 24, 1957, I disclosed an improvement in filling machines. It was stated therein that the machine could be used singly or in multiples by means of electronic control. It is my object in the present invention to teach these means and principles of synchronization.

Another object of this invention is to provide a filling control for containers which operates automatically to complete a filling cycle.

Yet another object of the invention is to provide a recycling, completely automatic container handling and filling machine for filling containers with semi-viscous fluids.

To provide an automatic handling and filling machine for filling containers with semi-viscous fluids at a high rate, one which is economical to manufacture, efficient and reliable in operation, and easy to maintain and install, are other objects of this invention.

These and other objects and advantages of this invention will become more readily apparent and understood from the accompanying specification and drawings in which.

In referring to the drawings, like reference numerals are used to indicate like and similar parts throughout the several views.

Figure 1:
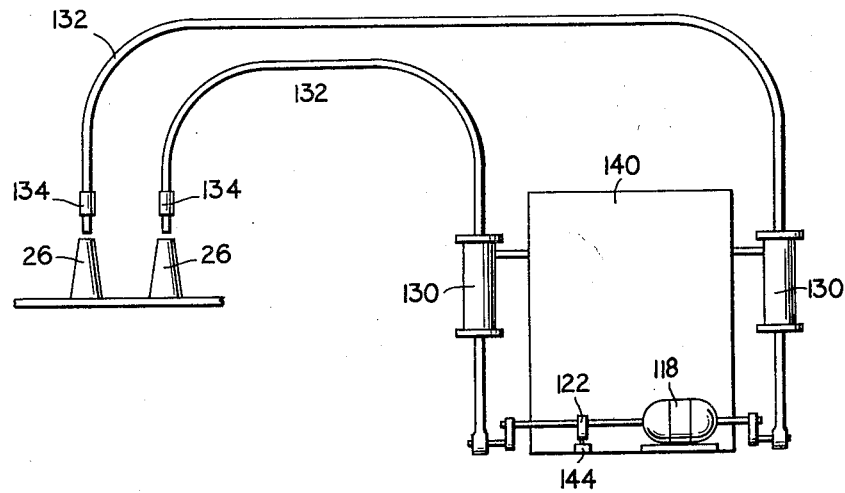
FIG. 1 is a schematic diagram of the mechanical portion of a simple filling system employing some principles of this invention.

The filling system of FIG. 1 consists of a filling machine 140 similar to that in above-referenced patent having reciprocating cylinder pumps 130 driven by a motor 118. The pumps 130 are connected to the liquid supply by a flexible tube, not shown, preferably a suitable plastic tube. A fluid feed line 132 connects each pump 130 to a suitably positioned discharge nozzle 134 with respect to containers 26 to be filled with viscous or semi-viscous fluids.

Figure 2:
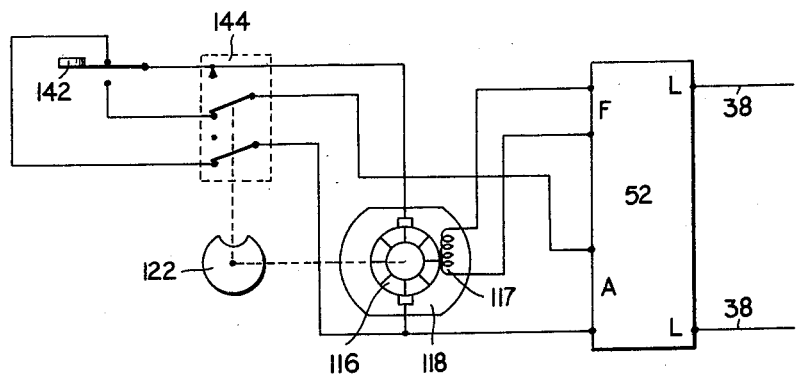
FIG. 2 is an electrical diagram of a control system used with the pumping system of FIG. 1.
Figure 3:
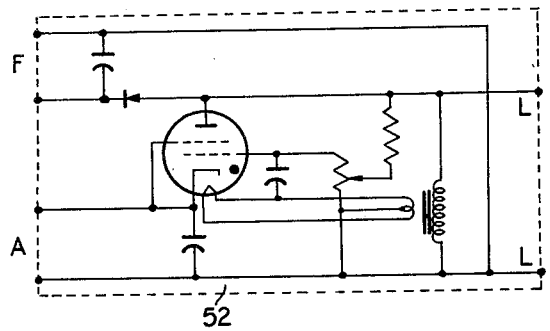
FIG. 3 is the schematic diagram of a motor speed control used with the invention.

A motor speed regulator 52 which may have the electrical configuration of FIG. 3 is shown in the diagram, FIG. 2. Regulator 52 has field supply terminals F, armature supply terminals A, and line terminals L. Motor 118 has an armature 116 and a field coil 117. In addition to driving reciprocating pumps 130, motor 118 rotates a motor cam 122. In conjunction with this cam 122, there is provided a microswitch 144 having single pole double throw contacts and single pole, single throw normally closed contacts. A switch 142, preferably in the form of a treadle, has single pole double throw contacts.

In this, a semi-automatic form of the invention, motor 118 is provided with field power by regulator 52 connected to a power line 38. Armature power passes first through the normally closed contacts of the double throw portion of switch 144 to the open contact of treadle switch 142.

When the operator momentarily depresses the treadle switch 142, armature 116 is therethrough energized and motor 118 begins to rotate. Cam 122 raises the contact arms of microswitch 144, the upper arm of the microswitch 144 then transfers the armature supply circuit from treadle switch 142 directly to the armature 116. Motor 118 continues to run, now under control of cam switch 144, and pumps 130 force fluid into containers 26.

After one revolution of motor 118, the containers have been filled and cam 122 drops microswitch 144 to the original start position, cutting off the power to the armature 116 of motor 118. In addition, the lower single pole contacts can be seen to throw a short-circuit leading through the upper contacts of treadle switch 142 directly across the armature 116. This electro-magnetically brakes motor 118, preventing over-rotation into another cycle of operation until triggered by the operator.

A completely automatic system will now be described. This form of the invention requires an operator only for loading a conveyor.

Figure 4:
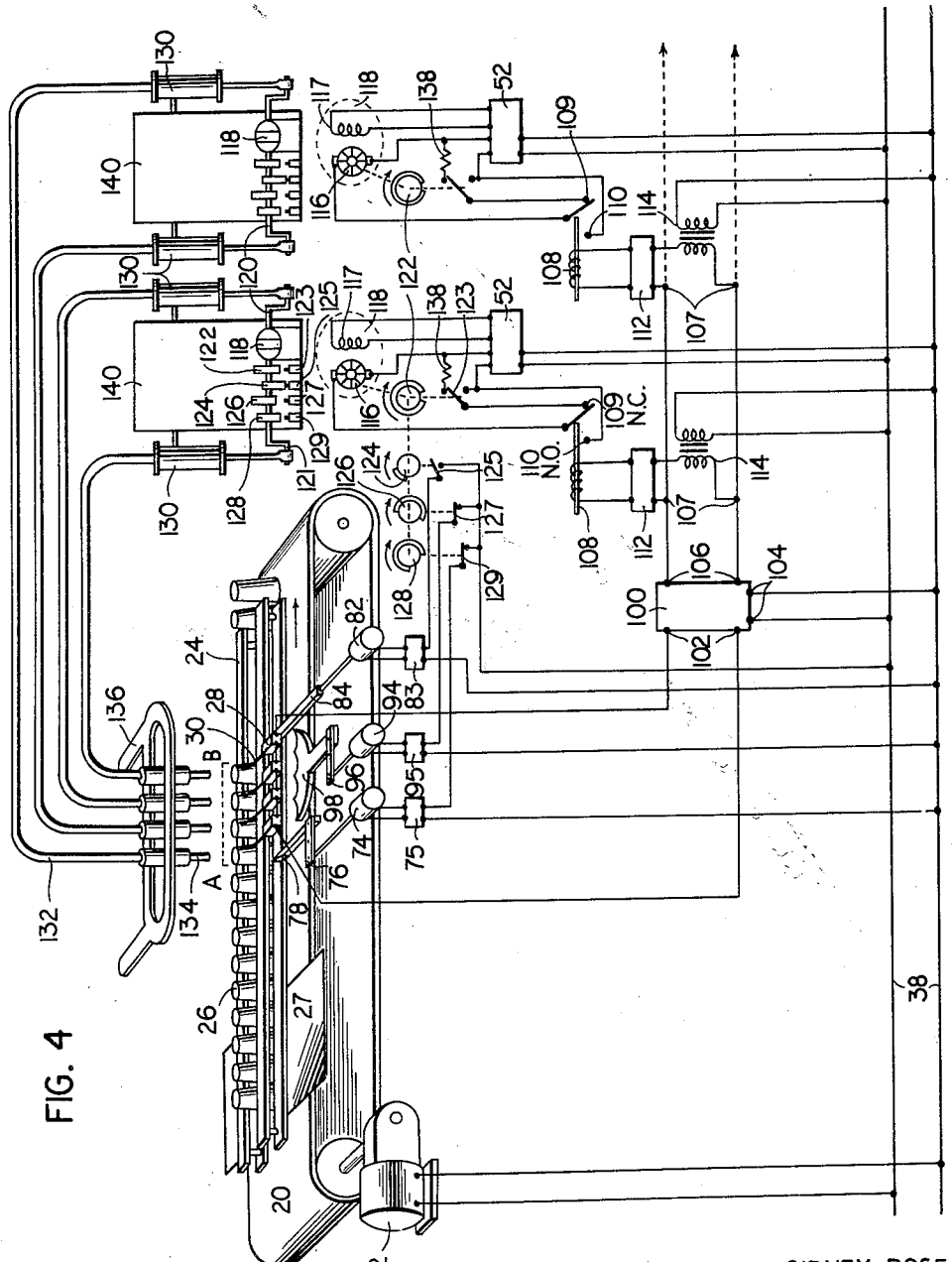
FIG. 4 is a perspective view of an automatic conveyor-filler machine, together with a schematic control diagram in accordance with principles of this invention.

The automatic system as illustrated in FIG. 4 consists of a conveyor belt 20 driven in the direction of the solid arrow by a motor 22 connected to a suitable power line 38. A set of guide rails 24, adapted for the containers 26, is suspended over the belt 20. A stationary platform 27 is mounted at the upstream end of guide rails 24 and just above the moving belt 20.

In a similar manner to that for the semi-automatic system, filling machines 140 are connected to discharge nozzles 134. These nozzles 134, pre-arranged on an adjustable support 136, serve containers 26 in a filling area A—B between the guide rails 24.

A plurality of microswitches 28, one for each container 26 in filling area A—B, are series connected and electrically attached to trigger terminals 102 of an electrical pulse former device 100 having output terminals 106 and power input terminals 104. Devices of this type are well-known in the art. The purpose of such a device is to produce a short impulse of circuit closure for each time a circuit connected to its input terminals is closed.

Output terminals 106 of device 100 are connected to triggering terminals 107, which in turn, are in series connection from an isolation transformer 114 to power a relay 108 through an intermediate rectifier 112.

Relay 108 is provided with a single pole, double throw contacts configuration with a normally closed contact 109 and a normally open contact 110.

Motor 118 of filling machine 140, as pointed out previously in connection with FIGS. 2 and 3, has an armature 116, a field 117, and has a regulated supply 52 therefor. Each motor 118 drives reciprocating pumps 130 by a shaft 120 and crank arm 121. On this same shaft 120 of motor 118, there are mounted a plurality of cams 122, 124, 126, and 128, said cams being arranged to actuate microswitches 123, 125, 127, 129, respectively.

The first microswitch 123 has a single pole, double throw configuration. Switches 125, 127 and 129 are of a single pole, normally open type and connect, respectively, to a stop actuating solenoid 82 with a rectifier 83, a positioning solenoid 94 with a rectifier 95, and a separator bar actuating solenoid 74 with a rectifier 75.

As seen in FIG. 4, a stop arm 84 is spring held in the path formed by guide rails 24 on the downstream side and adjacent to filling area A—B. A separator bar 78 is spring held by means of a linkage 76 in the path on the upstream side of filling area A—B. A positioner 98, which may have a blade formed to the contour of the group of containers 26, is spring held through linkage 96 in proximity to the containers in filling area A—B.

Positioner 98 is shown retracted in FIG. 4 for clarity although closed switch 127 elsewhere in the diagram would have it extended at the moment. The correct sequence of operation of the machine will now be described.

Microswitches 28 are provided with fingers 30 which sense the presence of a complete quota of empty containers 26 in filling area A—B against stop arm 84. The closed circuit thus produced signals pulse former device 100 which, in turn, provides a trigger pulse to relay 108. Normally open contacts momentarily close the circuit from regulator 52 to motor armature 116 to start motor 118.

At the end of the trigger pulse, contact 109 is restored but since cam 122 has started to turn and has closed the lower contacts of switch 123 the motor 118 continues to rotate.

Figure 5:
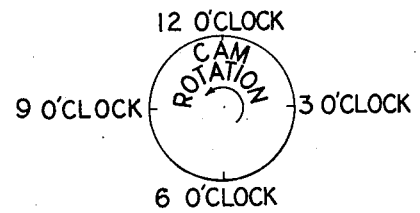
FIG. 5 is an operational cycle chart showing the sequence of functions of the machine of FIG. 4.
Figure 5:
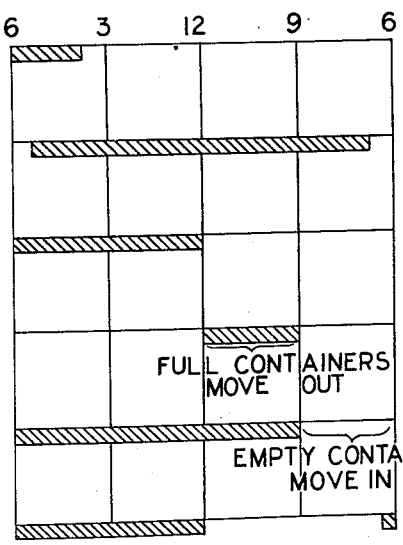

This operation can best be seen on the first two lines of the operational cycle chart illustrated in FIG. 5, where the cam rotation in counter-clockwise nomenclature is projected linearly with time from left to right.

During the first half cycle of rotation, namely from 6 o'clock to 12 o'clock, fluid from pumps 130 flows to the containers 26. Just prior to this function, positioner 98 was advanced against containers 26 under command of solenoid 94, switch 127 and cam 126 as the final operation of the previous cycle.

Upon completion of the fill stroke at 12 o'clock position, cam 126 opens switch 127 which releases solenoid 94. Positioner 98 is then withdrawn under spring action. At the same time, cam 124 closes switch 125 operating solenoid 82 which withdraws stop arm 84. The group of filled containers 26 is thus released from area A—B to move down the conveyor belt 20.

At the 9 o'clock position, cam 124 opens switch 125 to de-energize solenoid 82 and allow stop arm 84 to re-enter the path. Simultaneously, cam 128 closes switch 129 to energize solenoid 74, withdrawing stop arm 78 from the path allowing the empty containers 26 to move into filling area A—B. Near the end of this quarter cycle of operation, cam 126 re-closes switch 127 to energize solenoid 94 and move positioner 98 against the containers 26 in filling area A—B. This action accurately positions containers 26 under nozzles 134 and against microswitches 28 whereupon the cycle repeats.

Microswitches 28 also act as "no vial-no fill" devices since the pumping mechanism will not operate until they are all depressed simultaneousl. If a complete complement of containers is not in position under the filling nozzles, the mechanism will stop.

A positively motor stop in the nature of an electromagnetic brake prevents coasting of motor 118 into another cycle of operation. For this purpose, a damping resistor 138 is connected to the upper contact of cam switch 123. When this contact is closed under command of motor cam 122 and the normally closed contacts 109 are closed due to trigger signal cut-off, it can be seen that resistor 138 shorts armature 116 for a quick stop.

An additional filling machine may be added by merely paralleling their trigger terminals 107 as shown by dotted arrows extending to the right in FIG. 4. Sufficient microswitches 28 for the additional containers 26 are also required.

Obviously, many modifications and variations of the present invention are possible in light of the above teachings. It is, therefore, to be understood that within the scope of the appended claims, the invention may be practiced otherwise than as specifically described.

What is claimed:

1. A handling and filling machine for simultaneously filling a plurality of spaced containers with a viscous medium, comprising means for delivering calibrated, predetermined charges of said viscous medium to said spaced unfilled containers in a cyclic operation, means including a speed regulated motor for dispensing said calibrated predetermined charges of said viscous medium in accordance with the placement of said unfilled containers, a pulse forming means for initiating a cycle of operation for said speed regulated motor, a series of sensors, with there being one sensor each to each container in the filling zone, means responsive to all of said sensors and actuated by said containers to initiate said pulse forming means, and other mechanism including a continuously operated conveyor system for placement and displacement of said unfilled containers as well as said filled containers in synchronous relationship with said delivering means, whereby said viscous medium is delivered cyclically to said plurality of unfilled containers.

2. A handling and filling machine for simultaneously filling a plurality of spaced containers with a viscous medium, comprising, at least two spaced means for delivering calibrated, predetermined charges of said viscous medium to said spaced unfilled containers in cyclic operation, means including a speed regulated motor which is periodically electromagnetically braked to define said cyclic operation, a calibrated reciprocating pump for each delivering means for dispensing said calibrated predetermined charges of said viscous medium in accordance with the placement of said unfilled containers, an electric pulse forming means for simultaneously initiating a cycle of operatiaon of each speed regulated motor, a series of sensors, with one sensor each for each container in the filling zone, each of said sensors including a switch with means in the position of each container in the filling zone to actuate its respective switch, all of said switches being connected in series, means responsive to all of said sensors being actuated by said container to initiate said pulse forming means, and other mechanism including a continuously operated conveyor system for placement and displacement of said unfilled containers as well as said filled containers in synchronous relationship with said delivery means, whereby said viscous medium is delivered cyclically to said plurality of unfilled containers.

References Cited in the file of this patent
UNITED STATES PATENTS

| | | |
|---|---|---|
| 2,212,065 | Anderson | June 21, 1938 |
| 2,332,232 | Bleam et al. | Nov. 2, 1943 |
| 2,491,826 | Meyers et al. | Dec. 20, 1949 |
| 2,550,903 | Berch | May 1, 1951 |
| 2,620,960 | Harrington | Dec. 9, 1952 |
| 2,709,538 | Harrington | May 31, 1955 |
| 2,724,336 | Egerton | Nov. 22, 1955 |
| 2,772,705 | Anderson | Dec. 4, 1956 |
| 2,850,051 | Rasmussen | Sept. 2, 1958 |